United States Patent [19]

Bott

[11] 4,162,755

[45] Jul. 31, 1979

[54] LUGGAGE CARRIER ASSEMBLY

[76] Inventor: John A. Bott, 931 Lakeshore Dr., Grosse Pointe Shores, Mich. 48236

[21] Appl. No.: 845,846

[22] Filed: Oct. 27, 1977

[51] Int. Cl.² .............................................. B60R 9/00
[52] U.S. Cl. .................................... 224/326; 105/482
[58] Field of Search .......... 224/29 R, 42.1 R, 42.1 D, 224/42.1 E, 42.1 F, 42.1 G; 248/187; 280/179 R; 403/171, 172; 105/478, 482

[56] References Cited

U.S. PATENT DOCUMENTS

| | | | |
|---|---|---|---|
| Re. 26,539 | 3/1969 | Bott | 224/42.1 R |
| 1,854,951 | 4/1932 | Neuwirth | 248/187 X |
| 3,473,773 | 10/1969 | Meyer | 224/42.1 R X |
| 3,724,730 | 4/1973 | Olsen et al. | 224/42.1 D |
| 3,840,250 | 10/1974 | Bott | 280/179 R |
| 3,841,660 | 10/1974 | Clark | 280/179 R |
| 4,132,335 | 1/1979 | Ingram | 224/42.1 F |

Primary Examiner—Trygve M. Blix
Assistant Examiner—Winston H. Douglas
Attorney, Agent, or Firm—Harness, Dickey & Pierce

[57] ABSTRACT

A luggage carrier assembly is disclosed herein which is of the type adapted to be detachably secured to the roof or similar horizontally extending surface of an automotive vehicle or the like, the carrier assembly comprises a pair of spaced parallel article constraining members, such as crossrails or utility bars, and a pair of stanchion elements are associated with each end of each of the members; each of the stanchion elements is adapted to be secured to the roof of the associated vehicle by means of a generally vertically extending stud-like member having a lower end portion which is adapted for detachable engagement with a mounting device on the surface of the vehicle, with the upper ends of the stud-like members being cooperative with annular wheel-like members which may be manually grasped to move the stud-like member between engaged and disengaged relationship with the mounting devices on the vehicle, whereby the carrier may be selectively secured upon the vehicle surface and be conveniently removed therefrom during periods of non-use.

15 Claims, 16 Drawing Figures

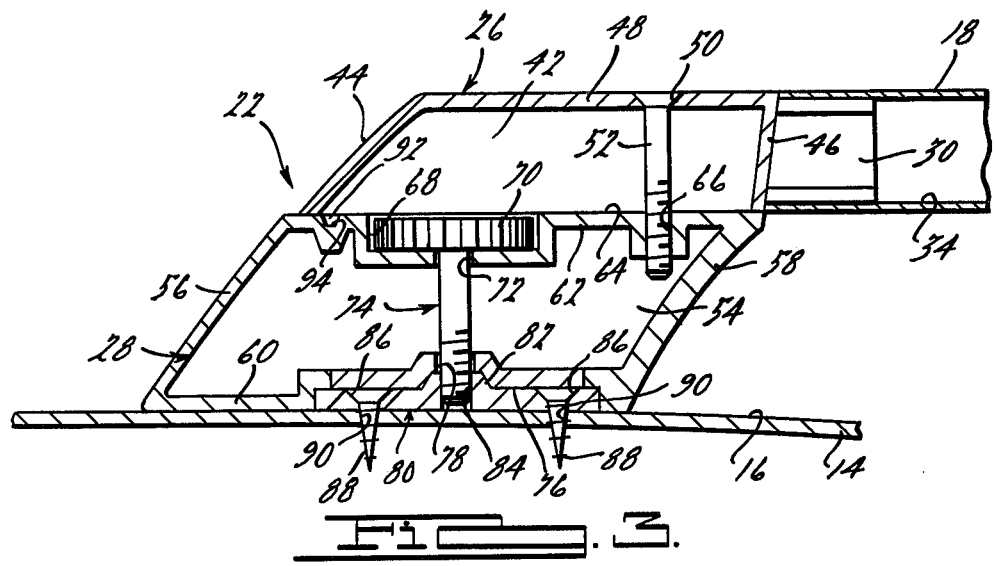
FIG. 3.
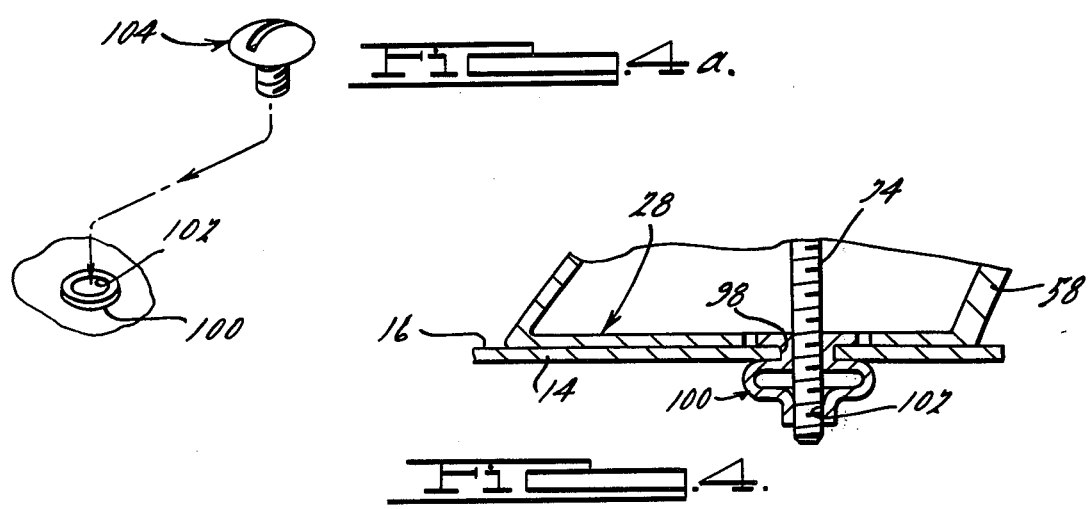
FIG. 4a.
FIG. 4.
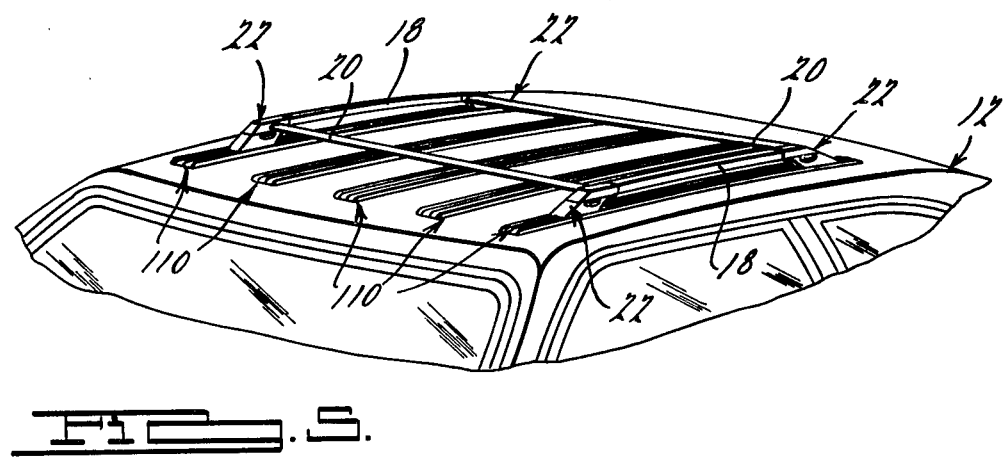
FIG. 5.

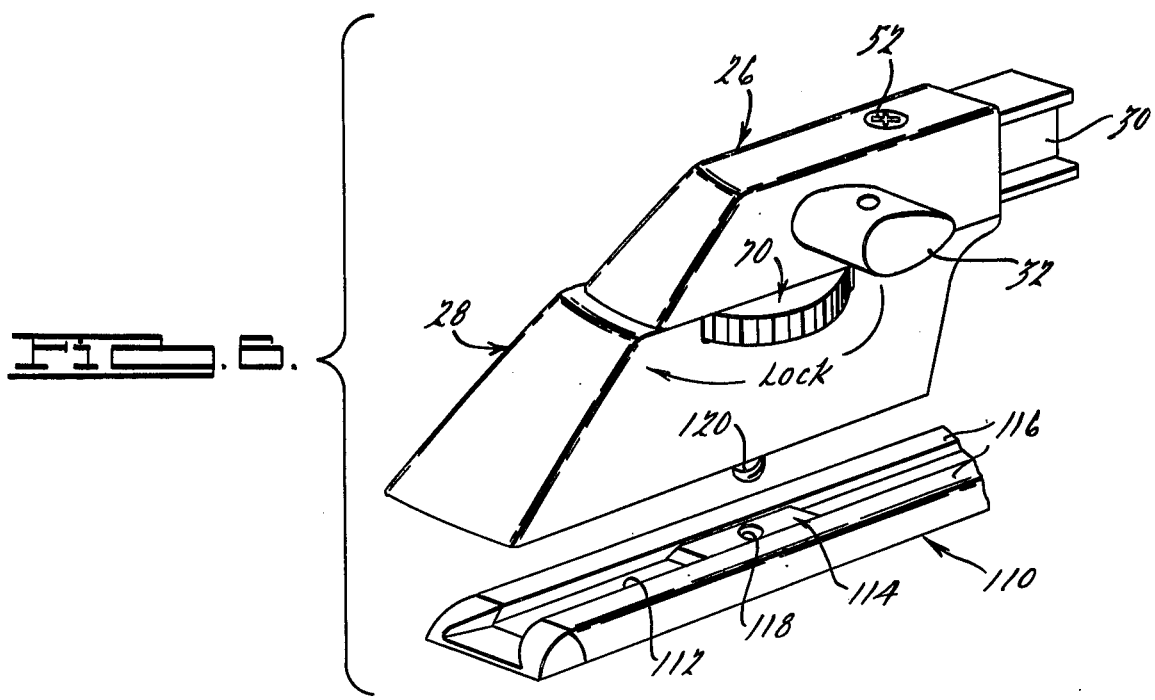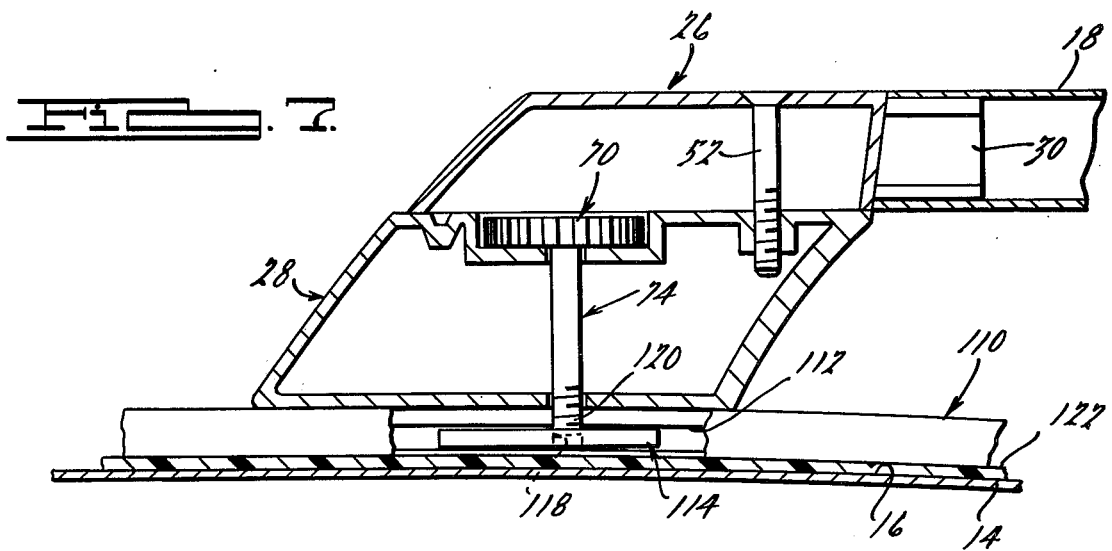

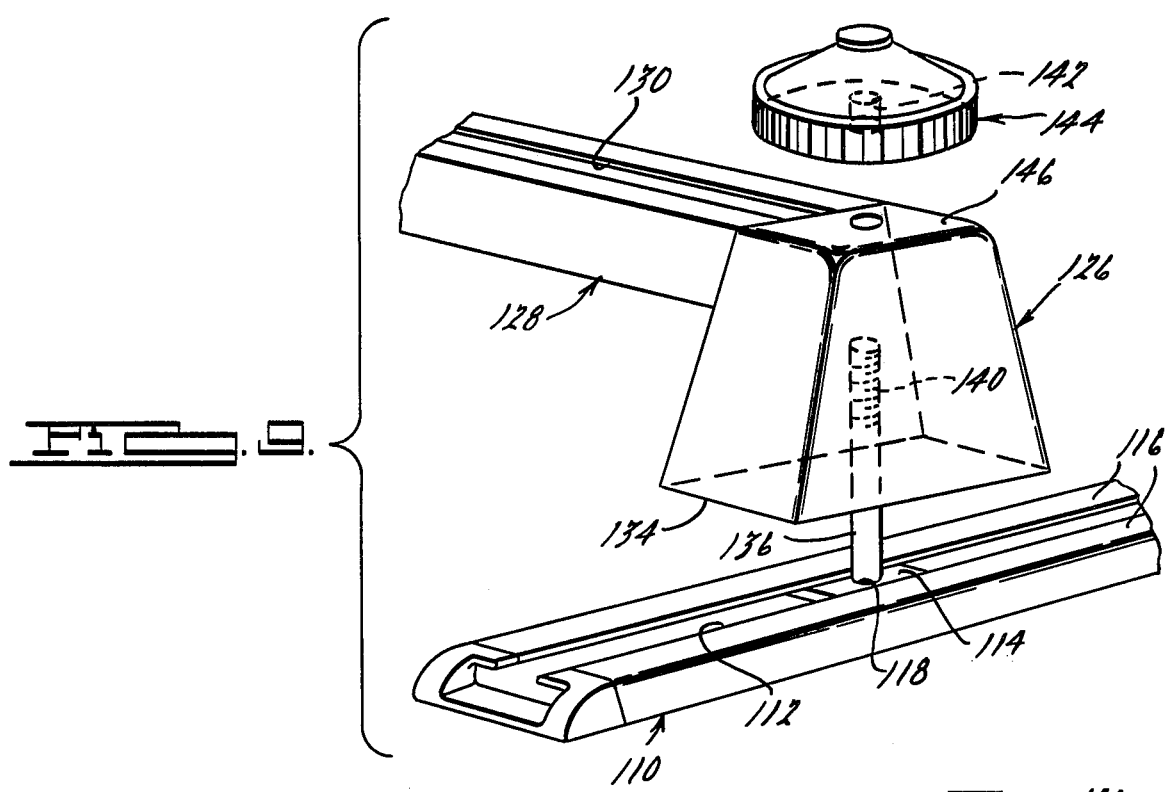
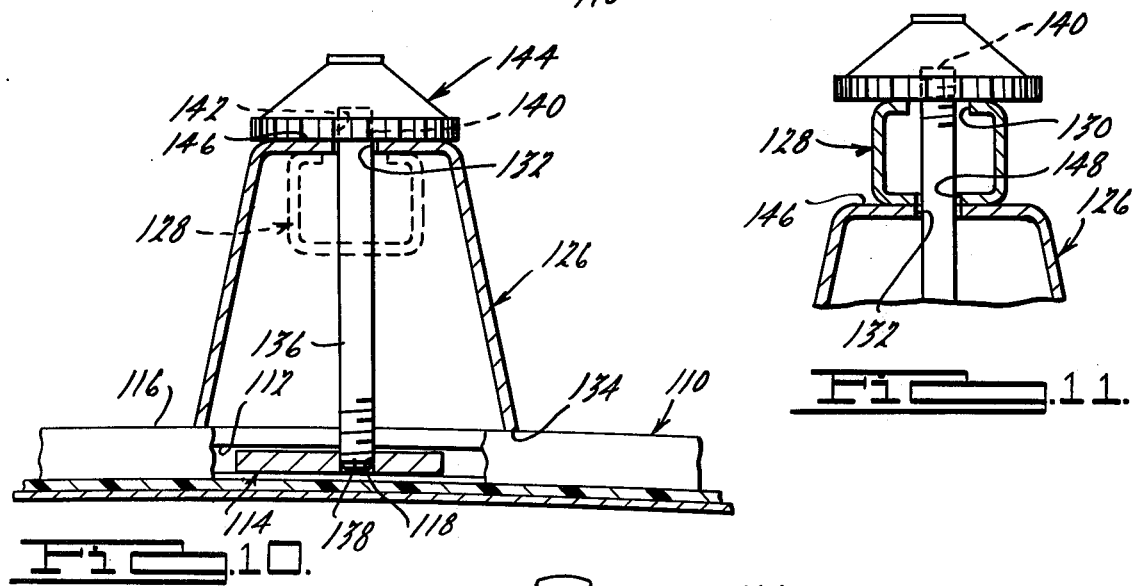
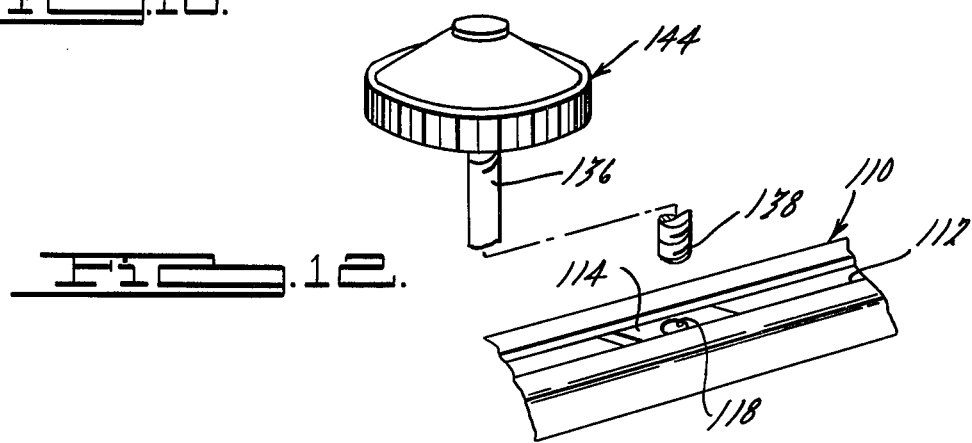

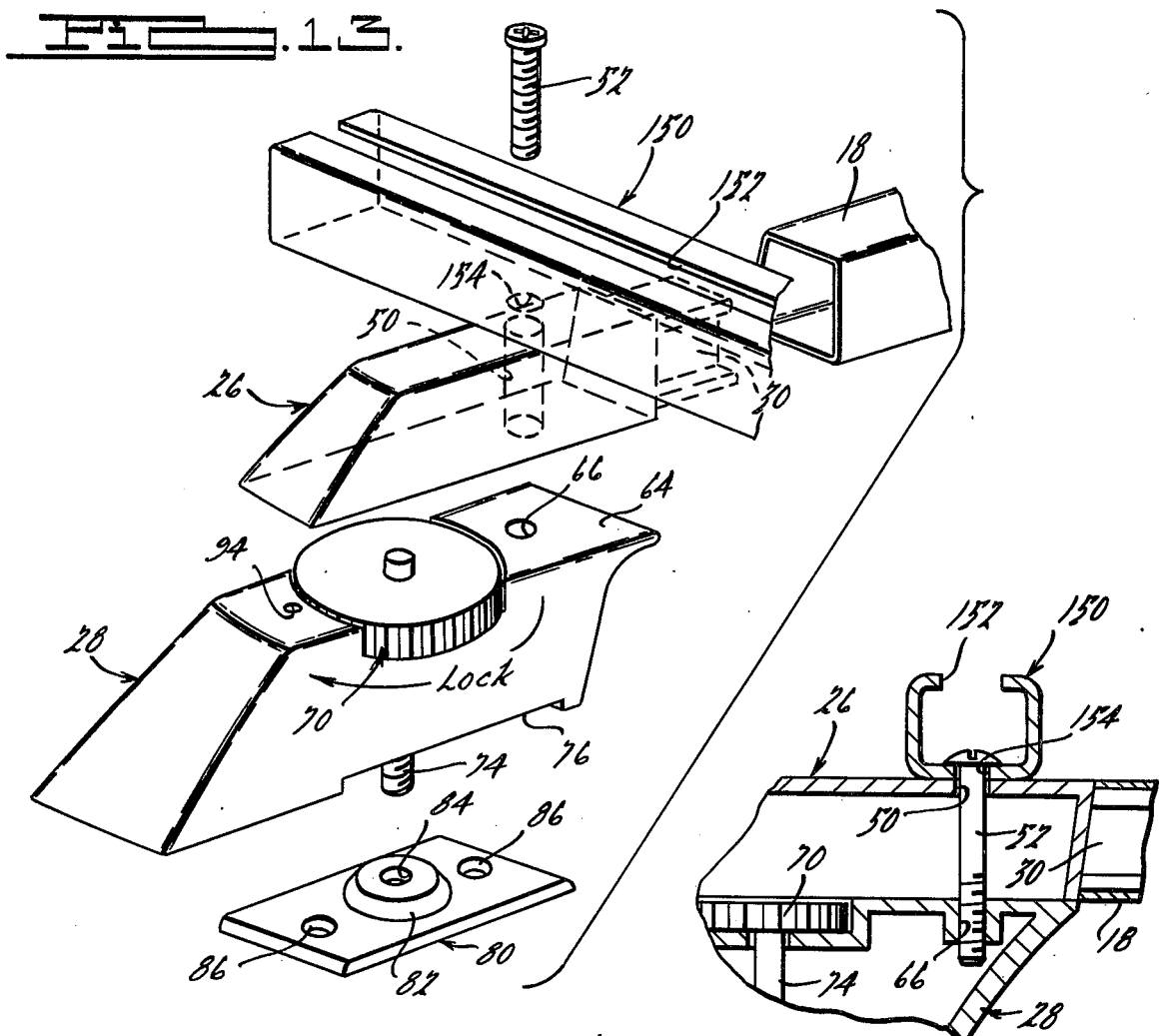

LUGGAGE CARRIER ASSEMBLY

SUMMARY OF THE INVENTION

This invention relates generally to vehicle luggage carriers and more particularly, to a new and improved luggage carrier which is adapted to be detachably secured to the roof or similar portion of the vehicle so that it may be conveniently removed during periods of non-use and be remounted upon the vehicle with a minimum amount of time and effort.

It is accordingly a general object of the present invention to provide a new and improved luggage carrier of the above-described type.

It is a more particular object of the present invention to provide a new and improved luggage carrier assembly which may be conveniently attached and removed from a vehicle.

It is a related object of the present invention to provide a new and improved luggage carrier of the above-described type wherein the luggage carrier is secured to the vehicle roof portion at each of the four corner stanchions of the assembly, with each stanchion being provided with a generally upright stud-like member having a manually engageable or graspable element adjacent the upper end thereof and having a lower end portion adapted for detachable engagement with mounting means on the vehicle.

It is a more particular object of the present invention to provide a luggage carrier of the above-described type wherein the mounting means may be in the form of a tapping plate secured to the vehicle surface, a riv-nut secured to said surface, or may be in the form of two or more longitudinally extending slat-like members having slidable tapping plates disposed thereon, whereby to provide for longitudinal adjustment of the article constraining members which extend between and are supported by the stanchion elements.

It is another object of the present invention to provide a new and improved luggage carrier assembly, as above described, which may be in the form of a luggage rack consisting of a pair of longitudinally spaced lateral extending crossbars and a pair of longitudinally extending laterally spaced side rails.

It is a further object of the present invention to provide a new and improved vehicle luggage carrier assembly wherein the stanchion elements may be of a multipiece or multi-section design, whereby to permit different portions of the stanchion elements to be fabricated of different materials and/or have different sections thereof be of different shapes to accommodate different vehicle roof configurations.

It is still another object of the present invention to provide a new and improved luggage carrier of the above-described type that is extremely pleasing in appearance, which is of a rugged and durable construction, and which may be economically manufactured and have a long and effective operational life.

It is still another object of the present invention to provide a new and improved luggage carrier assembly, as above described, which will find universality of application in supporting articles such as luggage, suitcases, and the like and/or may be provided with utility bars, whereby somewhat larger articles such as ladders, skis, boats, surfboards, bicycles, etc., may be conveniently attached to and carried upon the associated vehicle.

Other objects and advantages of the present invention will become apparent from the following detailed description taken in conjunction with the accompanying drawings.

BRIEF DESCRIPTION OF THE DRAWINGS

FIG. 3 is a cross-sectional view of the assembled stanchion element shown in FIG. 2;

FIG. 4 is a fragmentary cross-sectional view of a slightly modified embodiment of the stanchion mounting arrangement shown in FIG. 3;

FIG. 4a illustrates a closure element for use in closing the mounting aperture incorporated in the structure shown in FIG. 4 at such time as the stanchion element is removed from the vehicular roof;

FIG. 5 is an elevated perspective view of another embodiment of the vehicle luggage carrier assembly of the present invention;

FIG. 6 is an elevated perspective view of one of the stanchion elements incorporated in the luggage carrier shown in FIG. 5;

FIG. 7 is a cross-sectional view of the stanchion element shown in FIG. 6 after the same has been mounted on the associated vehicle roof;

FIG. 8 is an elevated perspective view of another embodiment of the luggage carrier assembly of the present invention;

FIG. 9 is an exploded assembly view of one of the stanchion elements incorporated in the luggage carrier assembly shown in FIG. 8;

FIG. 10 is an end elevational view, partially broken away, of the stanchion element shown in FIG. 9;

FIG. 11 is a view similar to FIG. 10 and illustrates another modified method of mounting the utility bar upon the associated stanchion elements;

FIG. 12 is a slightly modified embodiment of the mounting stud incorporated in the stanchion element shown in FIGS. 9–11;

FIG. 13 is an elevated exploded view of yet another embodiment of the luggage carrier of the present invention;

FIG. 14 is an enlarged fragmentary cross-sectional view of still another embodiment of the luggage carrier of the present invention; and FIG. 15 is a cross-sectional view of still another embodiment of one of the stanchion elements incorporated in the luggage carrier assembly of the present invention.

DETAILED DESCRIPTION OF THE PREFERRED EMBODIMENTS

Figure 1:
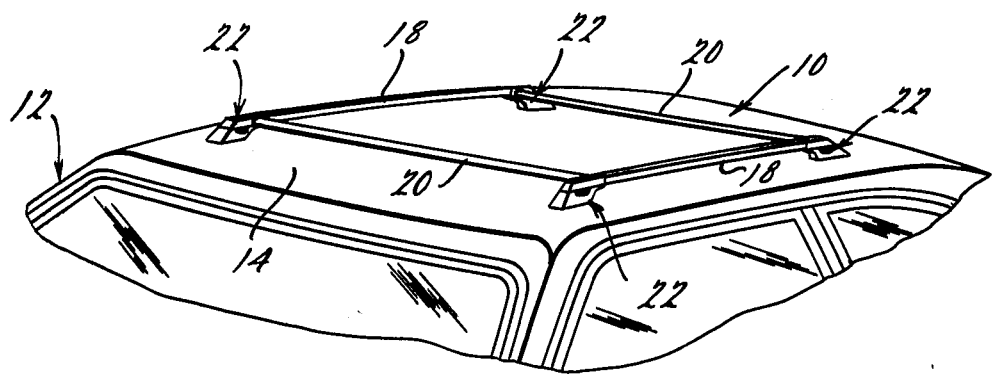
FIG. 1 is a fragmentary elevated perspective view of one embodiment of the luggage carrier assembly of the present invention, as shown in operative association with a typical automotive vehicle roof.

Referring now in detail to the drawings, and in particular, to FIG. 1 thereof, a luggage carrier assembly 10, in accordance with one preferred embodiment of the present invention, is shown in operative association with an automotive vehicle 12 having a roof portion 14 defining an upper surface 16 upon which the assembly 10 is adapted to be mounted. Generally speaking, the luggage carrier assembly 10 comprises a pair of longitudinally extending, laterally spaced side rails 18 and a pair of longitudinally spaced, laterally extending crossrails or bars 20. The rails 18, 20 are operatively supported at the four corners of the assembly 10 by means of a plurality of four stanchion elements, generally designated by the numeral 22. In accordance with the present invention, the carrier assembly 10 is adapted to be selectively removable from the roof portion 14 of the vehicle 12 and be conveniently re-attached or re-mounted thereupon through the simple manipulation of a plurality of fastening elements located one within each of the stanchion elements 22, as will hereinafter be described in detail.

Figure 2:
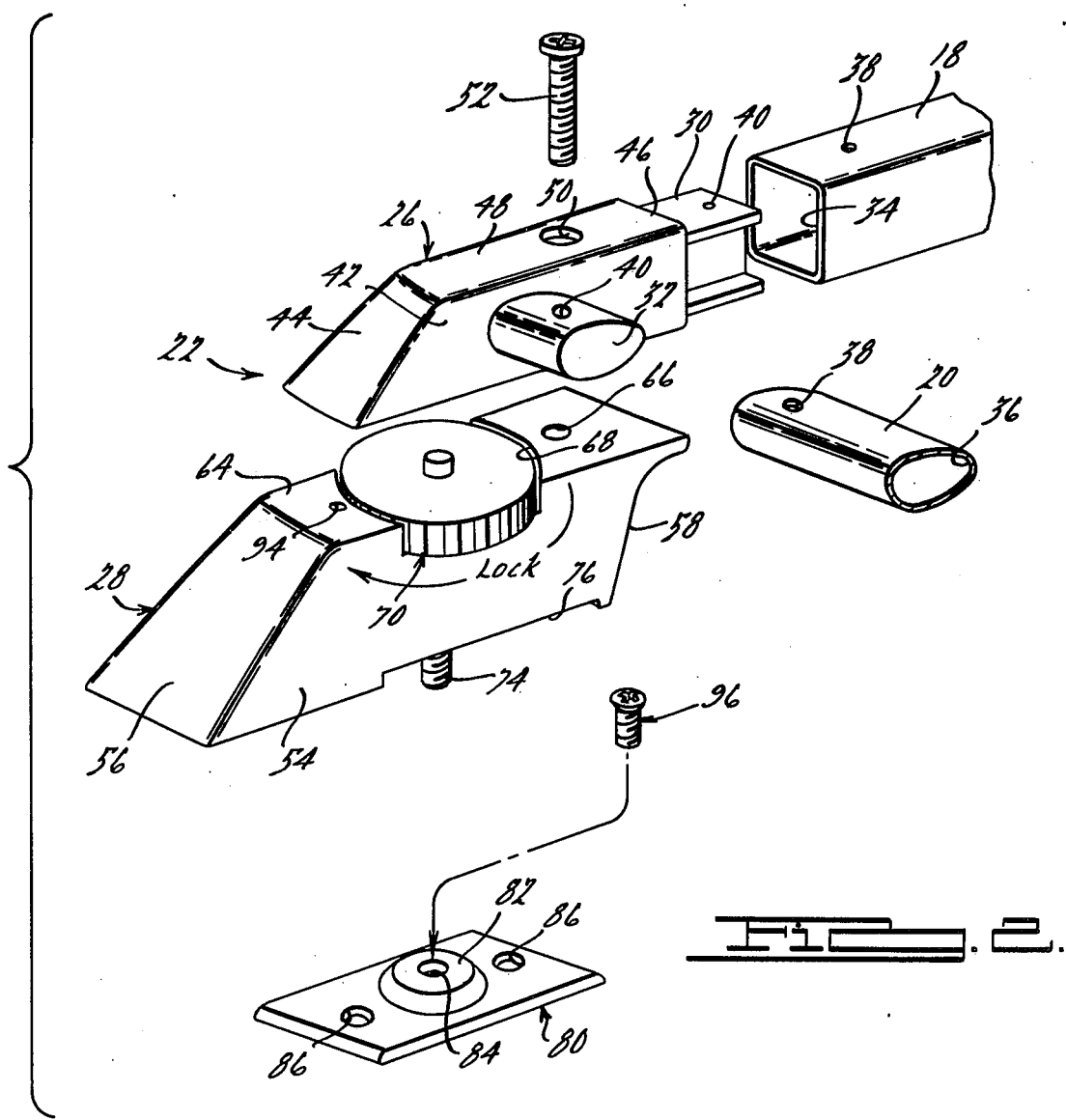
FIG. 2 is an exploded assembly view of one of the stanchion elements incorporated in the luggage carrier assembly shown in FIG. 1.

Referring now to FIGS. 2 and 3, each of the stanchion elements 22 comprises upper and lower stanchion sections 26 and 28, respectively, which may be fabricated of the same or different materials, depending upon the particular type of application, appearance and use which is desired of the assembly 10. For example, the lower stanchion section 28 of each of the elements 22 may be fabricated, for example, of a die-cast metal material, while the upper section 26 of each of the elements 22 may be fabricated, for example, of a molded plastic material having a different or a complementary appearance than the associated lower section 28. Of course, various alternative materials may be used without departing from the scope or fair meaning of the present invention, as will be appreciated by those skilled in the art. Each of the upper stanchion sections 26 is provided with a longitudinally extending boss or tongue portion 30 and with a laterally inwardly extending boss or tongue portion 32. As best seen in FIG. 2, the tongue portions 30, 32 are adapted to be telescopically received within hollow end portions 34 and 36 of the side rails 18 and crossrails 20, respectively, whereby to operatively support the rails 18, 20 upon the stanchion elements 22. Suitable screws, bolts or the like may be utilized for securing the members 18, 20 to the stanchion elements 22 and be adapted to extend through aligned apertures 38, 40 in a manner well known in the art.

Each of the upper stanchion sections 26 comprises inner and outer sides 42, longitudinally spaced end walls 44, 46 and a top wall or side 48 which is formed with a countersunk or other type of aperture 50 adapted to receive a suitable fastening element 52 for purposes to be hereinafter to be described. In a similar manner, the lower stanchion sections 28 each comprise inner and outer walls 54, longitudinally spaced end walls 56, 58, a bottom wall portion 60 and a top wall or side 62 defining an upwardly directed surface 64 upon which the associated of the upper stanchion sections 26 is adapted to bear. As will be appreciated by those skilled in the art, the particular shape or configuration of the upper and lower stanchion sections 26, 28 may be varied consistent with desired applications, appearance, etc., without departing from the scope of the present invention. The upper side 64 of the stanchion sections 28 is formed with a threaded bore 66 which is adapted to threadably receive the lower end of the fastening element 52 in order to fixedly secure the stanchion sections 26, 28 in a unitized assembly. The upper side 64 of each of the stanchion sections 28 is also formed with an annular recessed area 68 within which a manually engageable wheel-like member 70 is rotatably disposed. Preferably, the member 70 is of circular cross section having a diameter somewhat larger than the lateral thickness of the elements 22, whereby outer peripheral portions of the member 70 project laterally outwardly from the opposite sides of the elements 22 to provide for convenient manual engagement and rotation of the member 70 for purposes to be hereinafter described. The central portion of the recessed area 68 is formed with an opening 72 through which the upper end of a stud-like fastening member 74 projects, with the upper end of the member 74 being secured to and rotatable concomitantly with the member 70. The bottom wall or side 60 of each of the stanchion sections 28 is formed with a recessed area 76 which is formed with an opening 78 that is generally vertically aligned with an opening 72 and has the lower end portion of the fastening member 74 extend downwardly therethrough.

In accordance with one embodiment of the present invention, the roof 14 of the vehicle 12 is provided with four mounted devices in the form of generally rectangular mounting plates 80 at positions directly below each of the stanchion elements 22. Each of the mounting plates 80 comprises a central portion 82 defining a threaded opening 84, with the plates being fixedly secured, for example, to the roof 14 by suitable screws, bolts or the like 88 which extend downwardly through spaced-apart opening 86 in the mounting plates 80, the lower ends of the screws being threadably engaged with suitable openings 90 in the roof 14 in the manner best shown in FIG. 3.

As best seen in FIG. 3, the luggage carrier assembly 10 of the present invention is adapted to be fixedly secured to the roof 14 by having the lower threaded ends of the fastening members 74 threadably secured within the threaded openings 84 of the mounting plates 80, thereby providing an assembly which can be used in a conventional manner for securing luggage and the like upon the vehicle 12. At such time as it is desired to remove the assembly 10, for example, during periods of non-use, the plurality of wheel-like members 70 associated one with each of the stanchion elements 22 are rotated in a manner so as to threadably disengage the lower ends of the fastening members 74 from the mounting plates 80. Upon thus detaching the members 74 from the plates 80, the entire carrier assembly may be removed as a unit for purposes of storage, etc. At such time as it is desired to reinstall the assembly 10, the same is merely properly oriented upon the roof 14 such that the mounting plates 80 may be nestingly received within the recessed areas 76 of each of the elements 22 and thereafter, the wheel-like members may be properly rotated to again threadably engage the lower ends of the stud-like members 74 within the threaded openings 84 of the plates 80. It is to be noted that during such time as the assembly 10 is removed from the vehicle 12, suitable filler screws, such as is indicated at 96 in FIG. 2, may be threadably inserted into the openings 84 of the plates 80 to prevent road dirt, moisture and the like from accumulating therewithin, the screws 96 being removable, of course, preparatory to reinstallation of the assembly 10. If desired, the underside of the stanchion sections 26 may be provided with a downwardly extending positioning boss adapted to be nestingly received within a suitable boss receiving opening in the top wall 62 of the associated stanchion section 28 for positively positioning the stanchion sections in their desired operative relationship once the threaded fastener members 52 are assembled.

FIG. 4 illustrates a slightly modified embodiment of the present invention wherein the stanchion elements 22, instead of being secured to the roof 14 by the aforementioned mounting plates 80, are secured to the roof 14 by having the lower ends of the fastening members 74 extend downwardly through suitable openings 98 in the roof 14. Disposed within each of the openings 98 is a suitable internally threaded riv-nut device 100 having an internally threaded bore 102 adapted to threadably receive the ends of the members 74. As previously described, suitable filler or closure screws 104 may be temporarily installed within the bores 102 of the device 100 when the carrier assembly 10 is removed from the vehicle 12, as indicated in FIG. 4a. FIGS. 5-7 illustrate yet another embodiment of the present invention wherein the assembly 10 is adapted to be operatively associated with a plurality of laterally spaced parallel, longitudinally extending slats 110 that are fixedly secured to the surface 16 of the roof 14. At least the laterally outermost of the slats 110 are formed with longitudinally extending upwardly opening grooves 112 which may be of a generally dovetail-shaped configuration or other shape suitable for slidably retaining mounting plates 114 within the grooves 112. Specifically, each of the laterally outermost slats 110 is provided with a pair of the aforementioned mounting plates 114 so that one of such plates 114 will be associated with each of the stanchion elements 22. The upper surface of each of the outermost slats 110 are generally horizontally shaped, as indicated at 116 and are thereby adapted to positively support the underside of the stanchion elements 22. Each of the mounting plates 114 is formed with a suitable threaded aperture 118 adapted to threadably receive the lower end 120 of the associated fastening member 74 in essentially the same manner as was described in connection with the mounting plates 80. In this particular embodiment of the present invention, however, at such time as the fastening members 74 are properly rotated through manipulation of the wheel-like members 70 associated therewith, the mounting plates 114 cause the stanchion elements 22 to be positively clamped to the upper surfaces of the associated slats 110. In the event it is desired to longitudinally adjust the position of the carrier assembly 10 along the roof 14, the compressive force due to tightening of the fastening members 74 may be relaxed so that the entire assembly 10 and mounting plates 114 associated with each of the stanchion elements 22 may be moved longitudinally along the slats 110 to some new position, after which time the wheel-like members 70 may be again rotated in order to effect proper clamping action between the mounting plates 114, slats 110 and stanchion elements 22. It is to be noted that the shape of the grooves 112 in the slats 110 need not necessarily be dovetail-shaped but, instead, need only be of a suitable configuration to provide for longitudinally sliding movement of the plates 114 and prevent upward movement of the plates 114 out of the grooves 112. It should also be noted that the various interiorly or centrally located slats 110 may be of the same or of a different construction than the laterally outermost slats 110, and where desired, such interiorly located slats may be eliminated entirely. Additionally, if desired, the various slats 110 may be provided with suitable intermediate pads fabricated of rubber, plastic, etc., to be interposed between the upper surface 16 of the roof 14 and the undersides of the associated slats 110.

FIGS. 8-10 illustrate yet another embodiment of the present invention wherein a luggage carrier assembly 124 is shown as comprising a plurality of four stanchion elements 126 that are arranged at the laterally opposite ends of a pair of transversely extending cross or utility bars 128 which are adapted to be detachably secured to the roof of the associated vehicle 12 in a manner hereinafter to be described. As shown in FIGS. 9 and 10, the utility bars 128 are of a generally U-shaped configuration in transverse section and define upwardly open grooves 130 by which suitable fastening means may be secured in order to attach articles such as bicycles, boats, ladders, etc., upon the bars 128. Each of the stanchion elements 126 is provided with a central passage 132 and defines a lower or undersurface 134 which is adapted to bear upon the upper surfaces of the laterally outermost of a plurality of the aforementioned slats 110. Disposed interiorly of each of the stanchion elements 126 and extending upwardly through the central passages 132 thereof is a generally stud-like member 136, the lower ends 138 of each of which is adapted to be secured to a mounting plate such as the aforementioned plate 114 within the associated slat 110. The upper end 140 of each of the members 136 extends upwardly through the central passage 132 of the associated stanchion element 126 and is adapted to threadably engage a central threaded bore 142 of a manually graspable knob of wheel-like member 144 which, when threadably advanced upon the associated fastening member 136 is adapted to engage the upper surface 146 of the associate stanchion element 126 and clampingly secure said element 126 to the upper surface 116 of the subjacent slat 110. At such time as it is desired to effect removal of the carrier assembly 124, the plurality of wheel-like members 144 are merely threadably disengaged from the upper ends of the fastening members 136 and the utility bars 128 and stanchion elements 126 connected to the ends thereof may be lifted upwardly off from the members 136, whereafter the members 136 and associated mounting plates 114 may slide longitudinally of the slats 110 and be removed from the ends thereof.

In the embodiment of the present invention shown in FIGS. 8-10, the laterally outer ends of the utility bars 128 are intended to be secured to the laterally inner sides of the adjacent stanchion elements 126, for example, by having a suitable tongue-like member (not shown) formed on the elements 126 project into the laterally opposites of the grooves 130 in the bars 128. FIG. 11 discloses an alternate arrangement wherein the utility bars 128 are adapted to be supported at their opposite ends by bearing on the upper surfaces 146 of the elements 126. In this configuration, the lower sides of the utility bars are formed with suitable bars 148 which may be aligned with the bores 132 of the stanchion elements 126 and have the upper ends of the fastening members extend upwardly thereto so as to be engageable with the associated knob or wheel-like members 144. This particular arrangement will be advantageous from the standpoint that the utility bars may extend laterally outwardly beyond the stanchion elements 126 for supporting extraordinarily wide loads, such as boats, etc.

It is to be noted that the present invention is intended to encompass not only the arrangement shown in FIGS. 8-11 wherein the wheel-like members 144 are threadably secured to the upper ends of the fastening members 136, but also to arrangements wherein the members 136 are fixedly secured to the members 144 such that the lower ends 138 of the members 136 may be detachably threadably engaged with the openings 118 of the mounting plates 114, as best illustrated in FIG. 12.

A similar arrangement is shown in FIGS. 13 and 14 wherein utility bars 150 are adapted to be associated with the aforedescribed upper and lower stanchion sections 26, 28 of the stanchion element 22. The utility bars 150 are provided with upwardly opening grooves 152 and the bottom or lower side of each end of the utility bars 150 is provided with a suitable bore or opening 154 which is intended to be aligned with the opening 50 formed in the upper side of the upper stanchion section 26, whereby the aforementioned fastening element or the like 52 may extend downwardly through the openings 154, 50 and be threadably received within the threaded bore 56 of the lower stanchion section 28. In this arrangement, the same fastening element is utilized to secure the utility bar 150 to the stanchion element 22 as is utilized for connecting the stanchion sections 26, 28. This arrangement, of course, eliminates the need for the crossrail supporting tongues 32 and permits lateral projection of the utility bars 150 beyond the laterally outer sides of the stanchion elements 22.

FIG. 15 illustrates still a further modified embodiment of the present invention wherein a stanchion element 160 is shown as comprising upper and lower stanchion sections 26' and 28' which are of essentially the same construction as the analogous components hereinafter described and identified by like numerals. The essential difference between the stanchion element 160 and the aforedescribed elements 22 resides in the fact that the lower stanchion section 28' is provided with an annular enclosure portion 162 which is adapted to house or contain an annular wheel-like member 164. The member 164 is retained within the enclosure portion 162 in a manner such that the member 164 is freely rotatable, yet is confined against anything greater than minor lateral or longitudinal movement with respect to the section 28', with the result that the member 164 is essentially rotatable but "caged" within the stanchion portion 162. The member 164 is formed with a central threaded bore 166 which is aligned with openings 168 and 170 in the stanchion section 128 and is adapted to permit reception of the upper end 172 of a stud-like fastening member 174 such that the wheel-like member 164 can be threaded upon the end portion 172 to clampingly secure the entire stanchion element 160 upon an associated structural surface of the vehicle such as may be provided, for example, by an associated slat 110. It will be appreciated, of course, that the member 174 could be secured by any other suitable manner to the vehicle roof without departing from the scope of the present invention and that removal and replacement of the stanchion element 160 and associated luggage constraining members, such as the side rail 18' may be accomplished through threadably engaging and disengaging the member 164 upon the member 174, as hereinabove described.

It will be seen that the foregoing provides a novel luggage carrier assembly which will find wide and varied application by virtue of the flexibility of mounting means with which the carrier is operatively associated. More importantly, however, the present invention will be found to be highly advantageous from the standpoint that it may be conveniently mounted and removed from an associated vehicle with a minimum amount of effort and when removed, a minimum amount of structural components remain exposed on the vehicle roof so as to not detract from the aesthetics of the vehicle. Additionally, by virture of the fact that the stanchion elements may be fabricated of different materials, a wide variety of carrier appearances can be achieved with a minimum amount of tooling required. An additional feature resides in the fact that the upper stanchion sections 26 may have the tongue portions 32 thereof modified in shape consistent with "tuning" for positioning the associated crossrails so as to achieve minimum wind noise characteristics, which adjustment can be performed without requiring retooling of any of the other portions of the carrier assembly, thus providing a significant cost savings.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A luggage carrier assembly for an automotive vehicle or the like,
   said carrier assembly comprising a pair of spaced parallel article constraining members and a pair of stanchion elements associated with each of said members,
   each of said stanchion elements having spaced apart upstanding opposing side portions and a generally horizontally extending portion provided with a vertically disposed opening communicable at its lower end with cooperable mounting means attached to the vehicle upon which the assembly is mounted,
   a generally vertically arranged fastening member disposed in part and movable within each of said openings and adapted for engagement with said cooperable mounting means on the vehicle,
   said fastening member being vertically movable along a generally vertical axis located between the side portions of the associated stanchion element, and
   a manually engageable locking member disposed adjacent said horizontal portion of each of said stanchion elements and operatively connected with the upper end of the fastening member therein, at least one of said side portions having an access opening disposed above said mounting means and below said article constraining members, each of said locking members having an outer peripheral portion projecting laterally through at least one of said access openings and outwardly beyond at least one of said side portions of the associated of said stanchion elements, whereby said peripheral portion of said locking member may be manually engaged and rotated about said axis to thereby vertically move the fastening member connected thereto between engaged and disengaged relationship with said mounting means on said vehicle for selectively securing said stanchion element and said associated article constraining member to said vehicle, and for moving the same relative to said vehicle.

2. The invention as set forth in claim 1 wherein at least one of said cooperable mounting means comprises a mounting plate associated with one of said stanchion elements and secured to said vehicle surface and adapted for detachable engagement with said fastening member.

3. The invention as set forth in claim 1 wherein at least one of said mounting means on said vehicle comprises a threaded member fixedly secured to the vehicle surface and adapted for threaded engagement with one of said fastening members.

4. The invention as set forth in claim 1 wherein said article constraining members comprise a pair of crossrails extending laterally of the associated vehicle.

5. The invention as set forth in claim 1 wherein each of said fastening members comprises a threaded lower end portion adapted for threaded engagement with said cooperable mounting means on the vehicle.

6. The invention as set forth in claim 1 wherein said manual engageable means comprises an annular member adapted to be manually grasped for effecting rotation of the associated of said fastening members.

7. The invention as set forth in claim 1 wherein said manually engageable means are fixedly secured to the upper ends of the associated of said fastening members.

8. The invention as set forth in claim 1 wherein said article constraining members comprise a pair of side rails extending longitudinally between the stanchion elements on each side of said vehicle.

9. The invention as set forth in claim 1 wherein said article constraining members comprise a pair of cross-rails extending laterally of the vehicle and which include a pair of side rails extending longitudinally of the vehicle, the adjacent ends of said side rails and said crossrails being supported by said stanchion elements.

10. The invention as set forth in claim 1 wherein said stanchion elements are of a two-piece construction comprising a first section adapted to be secured upon said surface of said vehicle and a second section adapted to be secured to said first section.

11. The invention as set forth in claim 10 wherein said second section of said stanchion elements operably support said article constraining members.

12. The invention as set forth in claim 11 wherein said first sections of said stanchion elements operably support a pair of longitudinally extending side rails on said vehicle.

13. The invention as set forth in claim 10 wherein said locking members comprise rotatable wheel-like members which are recessed at least in part within said horizontal portions of said stanchion elements.

14. The invention as set forth in claim 13 wherein said fastening members comprise generally upright stud-like members having threaded lower end portions, and which include means fixedly secured to the surface of said vehicle adapted for threadable engagement with said stud-like members.

15. The invention as set forth in claim 13 wherein said wheel-like members are rotatably supported on said first stanchion sections of said stanchion elements and are freely rotatable thereon but confined or caged against relative lateral or longitudinal movement with respect to said stanchion sections.

* * * * *